United States Patent [19]
Winfield et al.

[11] Patent Number: 5,735,981
[45] Date of Patent: Apr. 7, 1998

[54] SUBSTRATE COVERING

[75] Inventors: Philip Roland Winfield; David Ions, both of Swindon, England

[73] Assignee: Raychem Limited, Swindon, United Kingdom

[21] Appl. No.: 537,651

[22] PCT Filed: Apr. 6, 1994

[86] PCT No.: PCT/GB94/00731

§ 371 Date: Oct. 5, 1995

§ 102(e) Date: Oct. 5, 1995

[87] PCT Pub. No.: WO94/23480

PCT Pub. Date: Oct. 13, 1994

[30] Foreign Application Priority Data

Apr. 7, 1993 [GB] United Kingdom ............ 9307348

[51] Int. Cl.$^6$ ............................................. H02G 15/18
[52] U.S. Cl. .................... 156/52; 156/229; 156/230; 156/294; 29/859; 29/450
[58] Field of Search ........................ 29/450, 858, 859, 29/235; 156/47, 49, 51, 52, 84, 229, 230, 297, 165, 293, 294, 287

[56] References Cited

U.S. PATENT DOCUMENTS

| 3,946,480 | 3/1976 | Dienes | 29/450 |
| 3,992,570 | 11/1976 | Beinhaur | 156/294 |
| 4,367,105 | 1/1983 | Rosier | 156/294 |
| 4,431,861 | 2/1984 | Clabburn et al. | 29/859 |
| 4,651,505 | 3/1987 | Gropper | 156/294 |
| 5,171,940 | 12/1992 | Vallauri | |
| 5,495,650 | 3/1996 | Crepel et al. | 29/235 |

FOREIGN PATENT DOCUMENTS

| 0422567 | 4/1991 | European Pat. Off. | H02G 15/18 |
| 0518560 | 12/1992 | European Pat. Off. | H01R 4/70 |
| 2503476 | 10/1982 | France | H02G 15/02 |
| 2592825 | 7/1987 | France | B25B 27/28 |
| 1 206 654 | 9/1970 | United Kingdom | B25B 27/02 |
| 2061631 | 5/1981 | United Kingdom | H02G 15/00 |
| WO 86/01047 | 2/1986 | WIPO | H02G 15/02 |
| 95/11542 | 10/1993 | WIPO | |

OTHER PUBLICATIONS

Search Report.

*Primary Examiner*—Michael W. Ball
*Assistant Examiner*—Michael A. Tolin
*Attorney, Agent, or Firm*—Herbert G. Burkard; Yuan Chao; Sheri M. Novack

[57] ABSTRACT

An arrangement for delivering an elastic sleeve on to an electric cable comprises an elastic sleeve (20) expanded radially on to a hollow rigid tubular support tube (18) with a tubular mesh (22) of plastics material interposed therebetween. The mesh (22) extends beyond one end of the support tube (18) and is then fed back through its hollow center. The one end of the tube (18) is disposed adjacent the end of the cable, and the mesh (22) within the tube (18) is progressively pulled so as to invert the sleeve (20) on to the cable end.

13 Claims, 3 Drawing Sheets

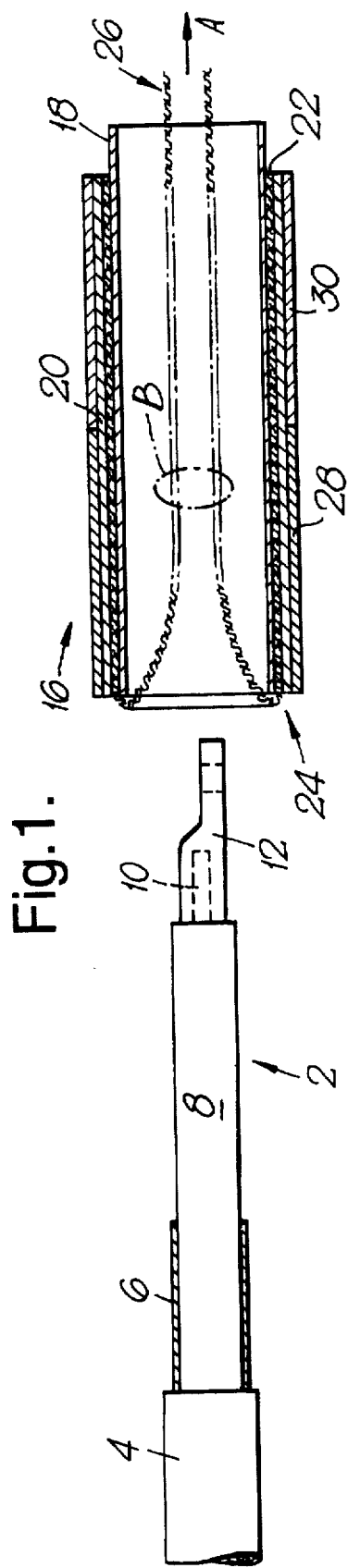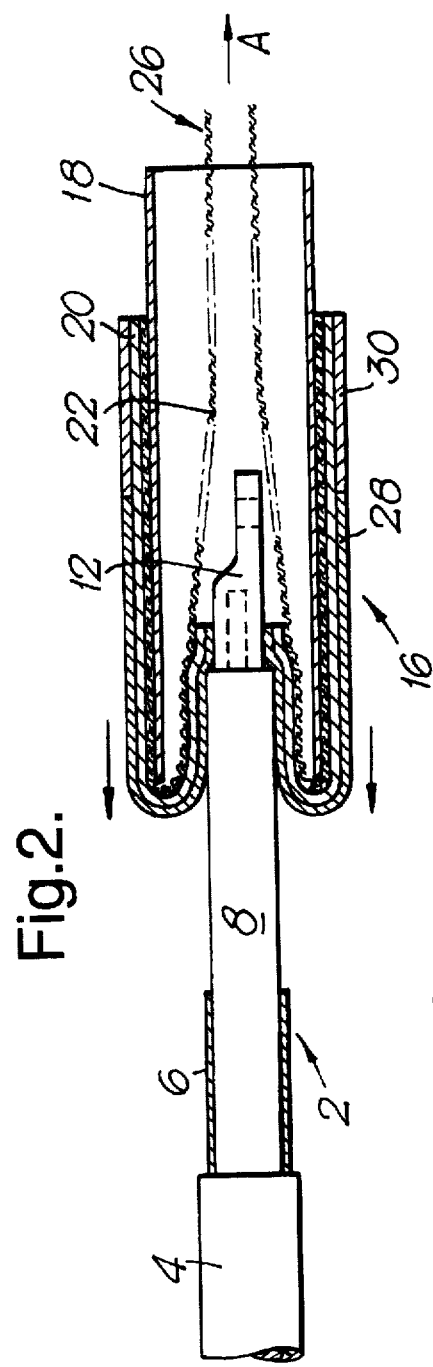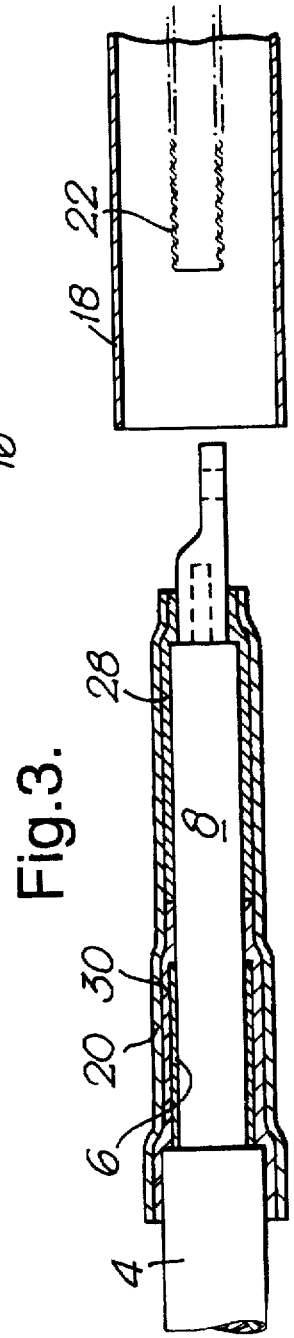

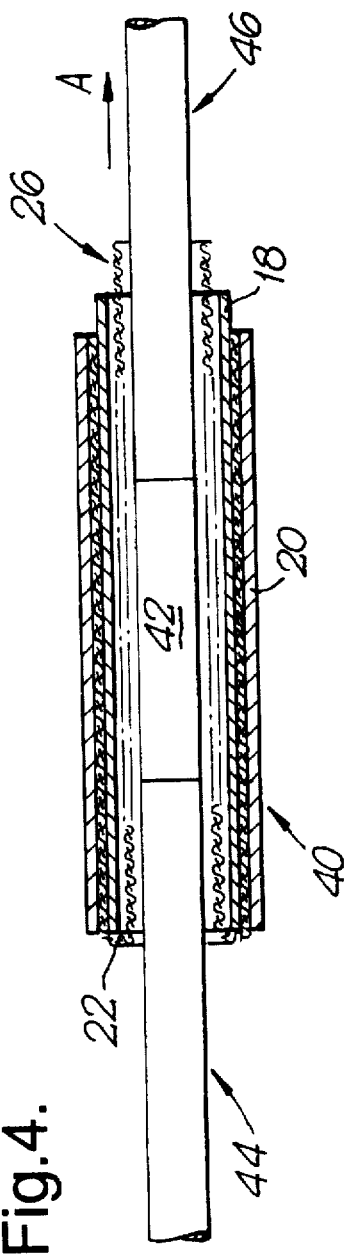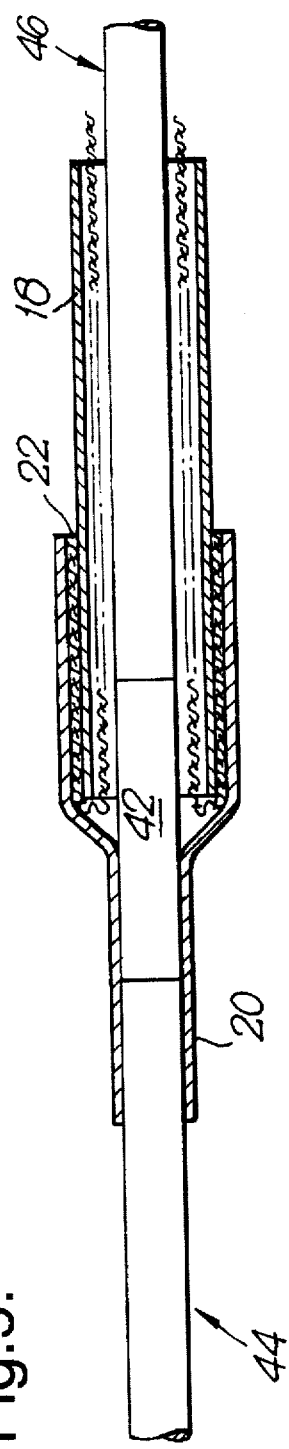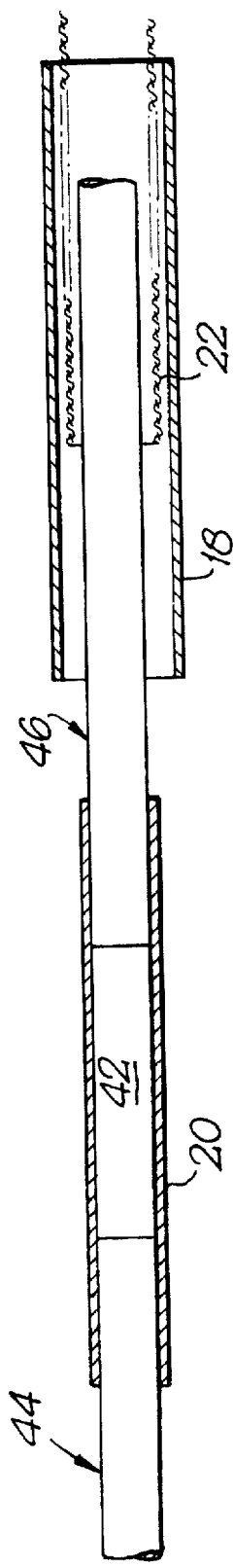

SUBSTRATE COVERING

The present invention relates to the covering of substrates, and particularly though not exclusively to the covering of elongate substrates such as the termination or joint region of an electrical power or communications cable for example. The invention is however applicable to the covering of any, preferably elongate, substrate, including pipes and rods.

Heat-recoverable articles, such as tubings, are well-known for such applications, but in some instances it may not be desirable or possible safely to apply heat to effect recovery of the article into conformity with an underlying substrate—for example in the presence of explosive gases such as can be found in mines. EP-A-0 210 807, EP-A-0 281 353 and WO/92 02754 disclose articles that can be used to enclose the joint or termination of power cables for example, in which a dual-walled tubular sleeve that has a lubricant retained between its walls, is revolved along the cable into the desired position. The polymeric material of which the sleeve is formed can be arranged to have desired insulating, conductive or stress grading properties.

U.S. Pat. No. 3,992,570 discloses a tubular member that is closed at one end so as to form a cap for sealing a free end of a cable. The closed end is urged against the cable end, and the remainder of the tubular member is pushed over the closed end and along the extremity adjacent the cable free end. WO 86/01047 discloses a hollow sleeve that is open at each end. One end of the sleeve is inverted back into itself and abutted against the free end of a cable, and the remainder of the length of the sleeve is progressively inverted on to the adjacent portion of the cable end. With each of these arrangements, however, significant fictional forces have to be overcome in order to dispose the sleeve on the cable, such forces being larger the greater the expansion of the sleeve that is needed for it to fit on to the cable and the longer the length of the sleeve. For this reason the range-taking ability is limited, and often several sleeves of different relaxed diameters are needed in order to be able to cover a range of cable diameters. A lubricant such as a grease may be applied to the substrate prior to application of the elastic tube, but this can be messy, attract unwanted contaminants, and, especially in electrical environments, be otherwise undesirable.

Some of the above-mentioned disadvantages are overcome using the concept of a pre-installed tube to hold out the covering sleeve until it is positioned over the substrate, the hold out tube then being removed or the sleeve otherwise released therefrom in order finally to position the sleeve on the substrate. U.S. Pat. No. 5,171,940, for example, discloses an arrangement in which a multi-layer sleeve is mounted on a tubular support in a radially stretched condition. After positioning over a cable joint region the sleeve is axially slid off the support, which then has to be removed. GB-B-2 099 638 shows an arrangement in which an elastic sleeve is rolled up at each end on to a relatively short tubular carrier that has a line of weakness circumferentially thereabout at its middle. After positioning around the joint region the carrier is broken into two portions and successively removed, the sleeve ends then being unrolled into conformity with the cable. U.S. Pat. No. 4,506,480 discloses an applicator for an elastic cover in which an elastic sleeve is folded back on itself with a lubricant between the overlapping portions thereof, and held in a radially-stretched configuration on a support. After positioning as required over the substrate, the overlapping portion of the sleeve is slid over the underlying portion on to the substrate, with the support ultimately being removed. In U.S. Pat. No. 4,070,746, a stretched elastomeric sleeve is held in a radially-expanded condition by being bonded to the inside of a tubular member. When in position, the bond is weakened by the application of a solvent thereto, and the hold out tube is subsequently broken to enable it to be removed.

The tubular products CONFORM-A-SLEEVE available from Markel Corporation of Pennsylvania, USA are formed as a unitary flexible silicone rubber coated fibreglass sleeving that uses the braided fibreglass on its inner surface to facilitate sliding over a substrate, so as to provide an insulating layer. EP-A-0 518 560 discloses an elastomeric tube in combination with a separate inner sleeve having low surface friction for facilitating sliding of the tube on to a substrate, such as an electric cable. With each of these constructions, however, the braid that provides the low friction surface remains in place on the substrate and, in each case unless further precautions are taken, this can result in moisture wicking along the interface between the elastomeric tube and the substrate. Such wicking could have significant disadvantages, particularly in a high voltage electrical application.

U.S. Pat. No. 3,515,798 discloses a tubular elastic cover that is held in a radially stretched configuration by means of a spirally-wound core. Progressive release of the core, after the assembly has been positioned as required about a substrate, allows the cover to collapse down on to the substrate.

GB-A-1206654 discloses a tool for applying a resilient sleeve to an electric cable, in which an elongate body portion is hollow at one end to receive the cable and is tapered at its other end to facilitate expansion of the sleeve on to the tool for transfer to the cable. The external surface of the tool is coated with a permanent layer of PTFE in order to reduce fiction as the sleeve is slid thereover. The tool may be manually or power operated in order to urge the sleeve up the taper, with its reduced friction outer surface, and then off the tool on to the cable.

It will be appreciated that with those known arrangements which require a sleeve to be slid into place, it is not possible to have a layer of nonsolid material, a mastic for example, between the sleeve and substrate. Furthermore, where stretched elastic sleeves are released by an internal hold-out member, known arrangements do not allow for the sleeve itself to carry a coating of such non-solid material for disposition between the sleeve and the substrate.

It is one object of the present invention to provide an arrangement for, and method of, delivering an elastic sleeve on to a substrate that overcomes, or at least alleviates, the above-mentioned disadvantages, and that does so in a particularly convenient and versatile manner.

In accordance with one aspect of the present invention, there is provided an arrangement for delivering an elastic sleeve on to a substrate, the arrangement comprising:

(a) a hollow support member, and (b) solid friction-reducing means interposed between the sleeve and the support member; wherein (c) the elastic sleeve is mounted in a radially-expanded configuration on the support member, and (d) the friction-reducing means is separable from the support member and from the sleeve; whereby the application of relative sliding motion between the sleeve and the support member allows delivery of the sleeve from the support member on to the substrate in a relaxed configuration.

The arrangement of the present invention thus takes advantage of using a solid friction-reducing means in order easily to slide the elastic, preferably elastomeric, sleeve off the support member, whilst avoiding disposing the friction-reducing means between the substrate and the sleeve. Thus, there should be relatively low friction between the friction-reducing means and the support member, and relatively higher friction between the friction-reducing means and the sleeve. It will be appreciated that the smallest internal transverse dimension, usually diameter, of the hollow support member should exceed the largest external dimension of the substrate, in order that the sleeve can be located on the substrate without the need for any sliding motion of the sleeve over the substrate. The function of the friction-reducing means is to facilitate sliding of the sleeve off the support member, and subsequently the friction-reducing means is no longer required. Advantageously, the friction-reducing means can itself be used to urge, pull, transport or otherwise slide the sleeve off the support member.

Advantageously the friction-reducing means is non-particulate, and preferably it is of a mesh construction, being formed by knitting or braiding for example. Advantageously the size, usually diameter, of the material forming the mesh, the mesh size, and the hardness of the materials of the mesh and of the sleeve are such that the sleeve is spaced substantially over its entire inner surface from the outer surface of the support member. The friction-reducing means is advantageously tubular, but it may alternatively be of sheet configuration, for example wrapped around the support member into a tubular configuration. The friction-reducing means can be of the same length as the sleeve, and delivery on to the substrate can be made by pushing the sleeve off the substrate to result in it being inverted on to the substrate with the friction-reducing means located on the outside of the installed sleeve, from where it can easily be removed. However, the friction reducing means preferably extends longitudinally to an appreciable extent beyond at least one end of the sleeve when the sleeve is coated on its external surface and thus cannot conveniently be pushed off the support member. The latter feature allows the sleeve to be removed from the support member by pulling on the projecting length of the friction-reducing means. With the extended length of the friction-reducing means being such as to allow it to extend beyond one end of the support member and back therethrough substantially to the other end thereof, such that its free end can be grasped, tension exerted on the friction-reducing means can pull the sleeve off at the one end of the support member, thus allowing it to relax on to a substrate, whilst the friction-reducing means is progressively removed through the interior of the hollow support member. By manipulation of the sleeve as it relaxes off the support member, the sleeve can be applied to the substrate in an inverted or non-inverted configuration.

Preferably the materials of the support member and the friction-reducing means are such that the force needed to remove the sleeve from the support member is less than about 300 Newtons, and preferably less than about 200 Newtons. The material of the friction-reducing means, and preferable also of the support member, is polymeric, although nonpolymeric materials may be employed if the frictional resistance is sufficiently low. Advantageously, the material of one of the friction-reducing means and support member comprises acrylonitrile butadiene styrene and the other comprises high density polyethylene. Other suitable materials for the tube and/or the friction-reducing means are suitable grades of the following polymers available from a number of suppliers: polytetrafluoroethylene (PTFE), polyethylene (PE), high density polyethylene (HDPE), medium molecular weight polyethylene (MMWPE), high molecular weight polyethylene (HMWPE), polyethyleneteraphthalate (PET), polypropylene (PP), unplasticised polyvinylchloride (UPVC), and polyvinylidenedifluoride (PVDF). Particular combinations of materials for the tube and friction-reducing means respectively, that have been found to have a sufficiently low coefficient of friction therebetween are: PTFE/PTFE, HDPE/PTFE, PTFE/PE, PP/PE, PET/PVDF, PET/PE, MMWPE/PTFE, UPVC/PE, NYLON 66/PE, Acetal/PE, HDPE/PP, HDPE/PET, UPVC/PTFE, Acetal/PVDF, PP/PTFE, HMWPE/PP and Acetal/PTFE.

It is to be understood that the friction-reducing means is employed to facilitate removal of the sleeve off the support member by exerting a relative axial force between the sleeve and support member. This can be achieved, for example, by separately gripping the support member and the sleeve and sliding the sleeve off, by gripping the support member and pulling the friction-reducing means such that it carries the sleeve off the support member, or by urging a closed end of the friction-reducing means against an end of the substrate to be covered by the sleeve. The friction-reducing means therefore has to be such that it provides relatively high frictional contact with the sleeve and relatively low frictional contact with the support member. For example a mesh configuration of the friction-reducing means in association with a relatively soft elastomeric material for the sleeve and relatively hard polymeric material for the support member would be a suitable combination.

The sleeve itself may be made of any suitable elastic material, including silicone and polyolefin elastomeric or rubber materials. The expansion ratio (ie. the ratio of its maximum practical stretched dimension, usually diameter, to its relaxed dimension) that can be achieved will depend not only on the material of the sleeve, but also on its wall thickness, but can typically be up to 3:1.

It will be appreciated that the support member needs to be sufficiently rigid so as to support the elastic sleeve in its expanded configuration.

The arrangement of the present invention is useful in electrical and/or environmental protection applications, for example. In the former case, the sleeve will be selected to have the required electrical characteristics—insulating, conductive, or stress-grading, by virtue of its material and/or, in the case if stress-grading, its configuration. An insulating sleeve may also be made substantially non-tracking, in accordance with ASTM D2303, or at least made to have enhanced resistance to the formation of conductive, usually carbonaceous, tracks therealong. In the case of environmental protection, the sleeve will be selected for its resistance to weathering (eg. by UV radiation, dust, moisture, acid rain, or other pollution or precipitation) or other chemical attack.

In its basic and most widely applicable form, the arrangement might comprise a right-cylindrical hollow tubular support member and a tubular elastomeric sleeve in a radially-stretched condition mounted thereon, with a tubular mesh of a material separating these two components that has a low coefficient of friction with respect to the material of the support member. The sleeve may be elongate and have a substantially uniform wall thickness throughout its length, for example by being made by extrusion. The sleeve may, however be a moulded component.

The delivery arrangement of the invention allows the sleeve to be positioned on the substrate in an inverted (i.e. inside-out) configuration, and thus one or more layers or coatings, for example of a sealant, mastic, adhesive, gel or grease, can be applied to part or all of the outer surface of the sleeve as disposed on the support member, with such layer or coating, after delivery, lying on the inside of the sleeve. Such a layer or coating may or may not be bonded to the sleeve. Thus, the sleeve may be a multi-layer sleeve. The sleeve may have a layer or coating of one material along part of its length and of a different material along another part of its length. Such a layer or coating may have selected electrical properties. Such an arrangement can take advantage of the fact that it is generally easier to manufacture a sleeve with an external coating than with an internal coating.

Since the delivery arrangement of the invention also allows the sleeve to be positioned on the substrate in a non-inverting configuration the outer surface of the sleeve, as disposed on the support member, may be convoluted or may be of shedded configuration. Such convolutions or sheds are particularly useful in high voltage electrical applications for increasing the path length for creepage (for example earth leakage) current between the ends of the sleeve, and also for shedding (electrically conductive) water from the sleeve. Such applications include cable terminations, insulators, surge arresters and bushings or feedthroughs.

It will be appreciated that a substrate may be enclosed by a plurality of discrete elastic sleeves by employing two or more arrangements, each in accordance with the present invention, to deliver elastic sleeves successively to the substrate.

Although in general the hollow support member of the arrangement of the invention may comprise a generally cylindrical configuration, it is envisaged that it may do so over only a part of its length. At least a portion of the support member may comprise a generally frusto-conical configuration. Advantageously, the support member comprises a first portion of its length, for example approximately half, of cylindrical configuration and the remainder of frusto-conical configuration. However, it is also envisaged that the entire support member may be frusto-conical. It will be appreciated that the support member will have a minimum transverse dimension, usually diameter, in order to hold the elastic sleeve stretched such that it can, upon delivery, relax on to the substrate. Also, on the one hand the stretched dimension of the sleeve is advantageously minimised. On the other hand, the frictional force resisting pull-off of the sleeve is proportional to the length of the overlap between the sleeve and support member. A reducing taper of the support member towards the take-off end for the sleeve will assist in removal of the sleeve, but for a support member that is entirely of frusto-conical configuration this could lead to one end portion of the sleeve being stretched to an unacceptable amount, and/or to premature and unwanted sliding off of the sleeve. Advantageously therefore, if the frictional pull-off force of an entirely cylindrical support member is too high, the support member may be of the abovementioned dual configuration. The cylindrical portion would correspond to the minimum diameter associated with a given substrate, and the remaining adjacent portion would be frusto-conical at an angle and of a length to facilitate ease of sliding of the sleeve and fiction-reducing means off the support member. Furthermore, the length of the cylindrical portion can be chosen so as to retain the sleeve on the support member during storage and until its required transfer to a substrate.

The cylindrical support member, or portion thereof, may be of circumferentially-convoluted configuration, at least on its outer surface, in order further to reduce the frictional drag on the friction-reducing means during relative longitudinal movement therebetween. The outer surface of the support member may also he treated or conditioned in order to reduce its coefficient of friction, for example by the inclusion in its formulation of a very small amount of silicone oil or PTFE.

Although the sleeve, and support member, would usually be elongate, it is envisaged that the arrangement of the invention could deliver a relatively short sleeve to a substrate. The sleeve could, for example, comprise a single shed, shield or disc (of appreciable radial extent) that is to be delivered on to an electric cable termination or similar substrate.

In a second aspect, the invention also provides a method of delivering an elastic sleeve on to a substrate by means of a delivery arrangement that comprises (i) a hollow support member, (ii) an elastic sleeve mounted in a radially-expanded configuration on the support member, and (iii) solid friction-reducing means that is interposed between the sleeve and the support member;

whereby the delivery arrangement is disposed adjacent the substrate, the sleeve is slid off the support member, the friction-reducing means is removed, and the sleeve is transferred on to the substrate in close conformity therewith.

Preferably, the delivery arrangement used in the method of the invention is as described in respect of said one aspect of the invention.

The method of the invention may be employed to deliver an elastic sleeve on to a substrate, particularly an elongate substrate, either at an end thereof or partway therealong, and either in inverting or non-inverting configuration. Reference to 'alignment' of the delivery arrangement with the substrate encompasses not only end-to-end axial alignment, but also surrounding co-axial alignment.

Embodiments of delivery arrangements and delivery methods, each in accordance with the present invention, will now be described, by way of example, with reference to the accompanying drawings, in which:

FIG. 1 is a side view of a delivery arrangement prior to delivery of an elastic sleeve on to the end of a high voltage cable;

FIG. 2 is a view of the embodiment of FIG. 1 partway through the delivery procedure;

FIG. 3 is a view of the embodiment of FIG. 1 on completion of the delivery procedure;

FIG. 4 is a side view of a delivery arrangement prior to delivery of an elastic sleeve to a joint region between two high voltage cables;

FIG. 5 is a view of the embodiment of FIG. 4 partway through the delivery procedure;

FIG. 6 is a view of the embodiment of FIG. 4 on completion of the delivery procedure;

Figure 7:
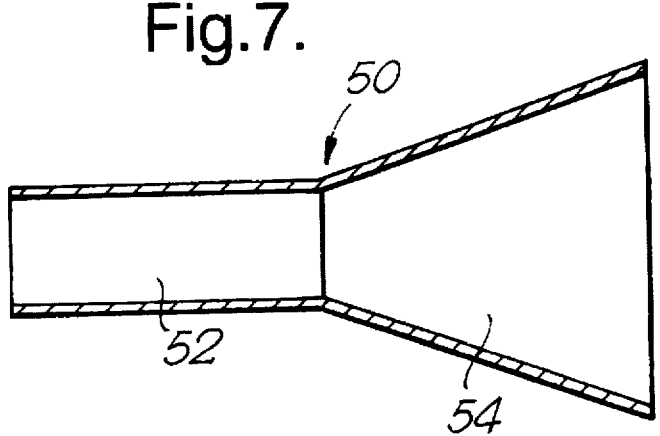
FIG. 7 is a side view of one modification of the support member of the embodiment of FIG. 1.

Referring to FIGS. 1, 2 and 3, one end of a single core high voltage cable 2 is schematically shown with its outer insulating, protective jacket 4 cut back to expose its semi-conductive screen 6, which has been cut back to expose its dielectric 8, which has been cut back to expose its conductor 10 (shown in broken line), to which a connecting lug 12 has been crimped.

A delivery arrangement 16 comprises a hollow cylindrical support tube 18 of acrylonitrile butadiene styrene that carries an extruded, radially-stretched electrically insulating elastomeric sleeve 20 of silicone rubber on its outer surface. A knitted tubular mesh 22 of high density polyethylene extends along the entire length of the sleeve 20 so as to lie between the tube 18 and the sleeve 20, to pass beyond a front end 24 of the arrangement 16 and thence back through the tube 18 so as to dispose its free end 26 beyond the other end of the arrangement 16. The sleeve 20 is shown carrying on its outer surface a first (optional) coating 28 of an insulating sealing mastic towards one end thereof and a second adjacent (optional) coating 30 of a stress control mastic towards the other end thereof.

The arrangement 16 is used to deliver the coated sleeve 20 on to the end of the cable 2 as follows:

The tubular arrangement 16 is aligned with the axis of the cable 2 (FIG. 1). The arrangement 16 is moved towards the cable 2 such that its front end 24 partially overlaps the cable lug 12. The free end 26 of the mesh 22 is pulled through the tube 18 in the direction of the arrow A whilst the adjacent exposed end of the tube 18 is tightly held. The mesh 22 slides over the outer surface of the tube 18, carrying with it the radially-tensioned sleeve 20. Alternatively, or additionally, the sleeve 20 may itself be pushed off the tube B, if the presence of the coatings 28, 30 allows this to be done conveniently. In the latter case, it will be appreciated that the mesh 22 need not extend beyond the length of the sleeve 20. As the sleeve 20 becomes disengaged at the front end 24 of the arrangement 16, it relaxes inwardly and is manually directed in an inverting configuration on to the cable lug 12 (FIG. 2). The exact positioning of this end of the sleeve along the length of the lug 12 can be adjusted by bodily axial movement of the arrangement 16 with respect to the cable 2. Having secured the leading edge of the sleeve 20 on to the lug 12, further pulling on the mesh 22 in the direction A, and pushing of the tube 18 in the opposite direction so that it increases its overlap with the cable 2, progressively delivers the sleeve 20 on to the cable. This is continued until the entire sleeve 20 is deposited on to the cable (FIG. 3). At this stage the mesh 22 has been completely removed, and the tube 18 can be pulled back off the cable 2.

The length of the sleeve 20 is such that it completely encloses the exposed lengths of cable screen 6 and dielectric 8, and overlaps at respective ends on to the jacket 4 and lug 12 so as to provide a good seal therewith. The sealing of the sleeve 20 on to the cable 2 is enhanced by the, now inner, coatings 28 and 30, and the coating 30 also enhances the control of the electrical stress at the cable cut backs. It will be noted that there is no sliding motion between the sleeve coatings 28, 30 and the underlying cable components during delivery, and that the mariner of delivery of the sleeve 22 on to the cable 2 is such as to urge air out from the interface therebetween.

The mesh tube 22 may be sealed at location B (as shown by dotted outline) within the support tube 18 so as to provide a closed end that can abut the lug 12. In this embodiment, the arrangement 16 is then pushed in the opposite direction to the arrow A, and then the engagement of the mesh 22 on the lug 12 effects transfer of the sleeve on to the cable 2. The position of the closure seal B is selected with respect to the leading end of the sleeve 20 so as to give the required longitudinal positioning of the sleeve 20 on the cable 2.

Referring now to FIGS. 4, 5 and 6, a delivery arrangement 40 is similar to the arrangement 16 of the previous embodiment, except that it carries no coatings on the outer surface of the sleeve. The same reference numerals, for convenience, are used for corresponding components. In this embodiment, the sleeve 20 is to be delivered so as to enclose a joint region 42 (shown schematically) between two jacketed cables 44, 46. The delivery arrangement 40 is disposed to one side over one of the cables 44, 46 before the joint 42 is made. Subsequently, the arrangement 40 is longitudinally positioned over the joint with the ends of the sleeve 20 coaxially aligned with their required final positions on the cables 44, 46 respectively (FIG. 4).

In this embodiment, the sleeve 20 will be delivered in a non-inverting manner. The mesh 22 is pulled relative to the tube 18 in the direction of the arrow A, and as the front end 24 of the sleeve 20 relaxes off the tube 18, it is manually guided to sit without inversion at its required position on the cable jacket 44 (FIG. 5). Subsequently, the mesh 22 and tube 18 are moved, relative to one another but both in the direction A, progressively over the cable jacket 26, with the sleeve 20 sliding on the mesh 22 so as to disengage from the tube 18 and be smoothly delivered on to the jointed cables, until upon complete disengagement (FIG. 6) the sleeve 20 is correctly positioned in conformity with the jointed cables. The tube 18 and mesh 22 can then be removed completely. The latter step can be achieved by cutting the mesh, and by breaking the tube 18. The mesh may alternatively be a flat layer that is wrapped around the support member into a tubular configuration, and may thus be easily removed after delivery of the sleeve on to the substrate. As an alternative to breaking the support member, such as the tube 18, it may be formed as a single hinged part, or in two or more parts arranged for easy disassembly from a tubular configuration.

FIG. 7 shows an advantageous form of support member for use in the invention, in that it comprises a tubular body 50 having a first portion 52 of its length formed as a cylinder and an adjacent second portion 54 of frusto-conical configuration. The internal diameter of the first portion 52 is the minimum diameter necessary for passing over the substrate, for example electric cable, and helps to retain the sleeve (not shown) on the body 50. The tapered outer surface of the second portion produces a component of the residual recovery forces in the distended sleeve that acts in the direction of the force applied to remove the sleeve from the support member, thereby reducing the frictional forces between the friction-reducing means (not shown) and the body 50, and thus facilitating delivery of the sleeve.

It is pointed out that for a given minimum diameter of the support member, the combined cylindrical and frusto-conical shaping as exemplified in FIG. 7 results in a smaller diameter at the free end of the frusto-conical portion than would be the case with a support member of the same overall length that was completely of frusto-conical configuration. The advantage of the FIG. 7 embodiment therefore is in the combination of reduced pull-off force with reduced stretching of the elastic sleeve.

Figure 8:
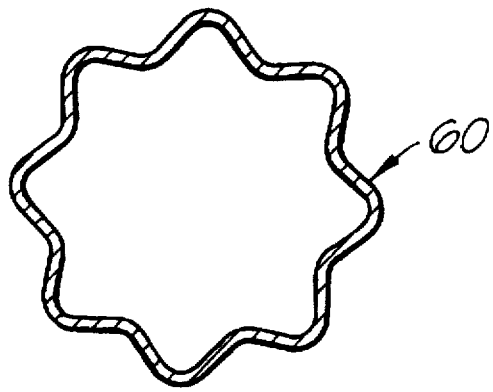
FIG. 8 is a cross-section of another modification of the support member of the embodiment of FIG. 1.

FIG. 8 shows another advantageous form of support member 60, that has a convoluted cross-section. Since contact with the friction-reducing means (not shown) of the delivery arrangement takes place only over the peaks of the convolutions, the pull-off force is reduced with respect to the tube 18 of the embodiment of FIG. 1.

Figure 9:
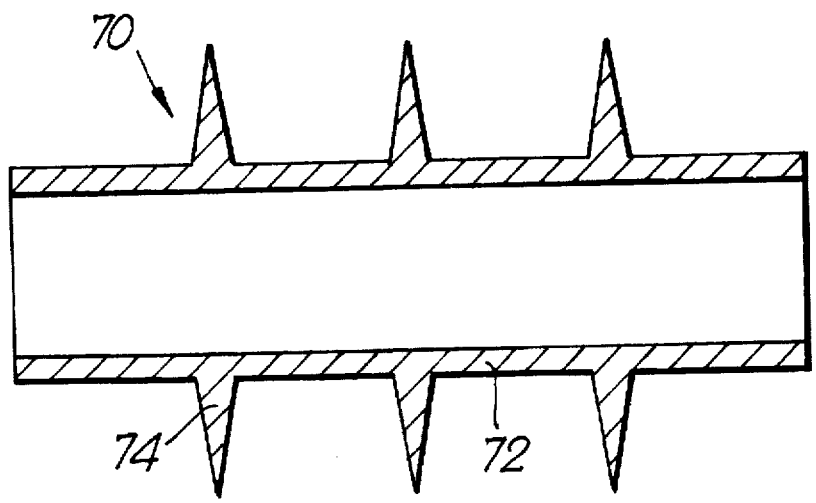
FIG. 9 is a section through a further embodiment of sleeve that can be delivered by the arrangement of the present invention.

Referring to FIG. 9, an elastomeric sleeve 70 comprises a generally cylindrical main body portion 72 of uniform diameter and wall thickness, that has a plurality of longitudinally spaced-apart sheds 74 around its circumference extending radially therefrom. The sheds 74 not only increase the surface path length between the extremities of the sleeve 70, but also, when the sleeve is mounted in an inclined orientation, serve to shed water, ie. to direct water, or other liquid contaminants, off the body 72. This ability is particularly useful when the sleeve, of electrically insulating, and preferably non-tracking, material is applied, in a non-inverting manner, on to, for example, the termination of an outdoor high voltage cable. Although the sleeve 70 is shown as having three sheds 74, in general, such a sleeve may have fewer or more, depending on the operating conditions and requirements of the final installation. For example, the sleeve may be very short and in effect comprise only a single shed.

Several embodiments of the delivery arrangement of the present invention have been described, by way of example, and it is to be understood that some or all of the features of any one embodiment may be combined with some or all of the features of another embodiment where appropriate. For example, the configurations shown in FIGS. 7 and 8 for the support member may be embodied in a single article.

We claim:

1. An arrangement for delivering an elastic sleeve on to a substrate, the arrangement comprising:
   (a) a hollow support member, and
   (b) solid friction-reducing means interposed between the sleeve and the support member; wherein
   (c) the elastic sleeve is mounted in a radially-expanded configuration on the support member and has a layer of sealant, mastic, grease or gel material on its outer surface, and
   (d) the friction-reducing means is separable from the support member and from the sleeve; whereby
   the application of relative sliding motion between the sleeve and the support member is arranged to allow delivery of the sleeve from the support member on to the substrate in a relaxed configuration.

2. An arrangement according to claim 1, wherein the friction-reducing means is of a mesh construction.

3. An arrangement according to claim 2, wherein the mesh construction of the friction-reducing means is arranged so as to space the sleeve over substantially its entire inner surface from the outer surface of the support member.

4. An arrangement according claim 1, wherein the materials of the support member and the friction-reducing means are such that the force needed to pull the sleeve off the support member is less than about 300 Newtons.

5. An arrangement according to claim 4, wherein the material of one of the friction reducing means and support member comprises acrylonitrile butadiene styrene and the other comprises high density polyethylene.

6. An arrangement according to claim 1, wherein the sleeve is of polymeric material and is substantially electrically non-tracking.

7. An arrangement according to claim 1, wherein at least a portion of the support member comprises a generally frusto-conical configuration.

8. An arrangement according to claim 1, wherein at least a portion of the outer surface of the support is of circumferentially-convoluted configuration.

9. A method of delivering an elastic sleeve on to a substrate, by means of a delivery arrangement that comprises
   (i) a hollow support member,
   (ii) an elastic sleeve mounted in a radially-expanded configuration on the support member, and
   (iii) solid friction-reducing means that is interposed between the sleeve and the support member;
whereby the delivery arrangement is disposed adjacent the substrate, the sleeve is slid off the support member, the friction-reducing means is removed, and the sleeve is transferred on to the substrate in close conformity therewith; wherein (i) the delivery arrangement and the substrate are of generally elongate configuration and are disposed in substantial axial alignment with each other, (ii) one end of the sleeve is slid off the support member and inverted into conformity with the substrate, and (iii) the hollow support member is moved progressively along the substrate until the remainder of the sleeve is invertingly transferred from the support member on to the substrate.

10. A method according to claim 9, wherein the friction-reducing means extends beyond said one end of the sleeve and passes back through the support member, and wherein the transfer of the sleeve is facilitated by tension exerted on the friction-reducing means in a direction relatively opposite to the movement of the support member.

11. A method according to claim 10, wherein the sleeve has at least one layer on its outer surface prior to the inversion step, which layer is located between the sleeve and substrate subsequent to the inversion step.

12. A method according to claim 11, wherein the layer comprises a coating of a mastic, sealant, gel or grease.

13. A method according to claim 9, wherein the substrate is an electrical component, preferably a termination or joint region of a power cable.

* * * * *